United States Patent Office 2,887,491
Patented May 19, 1959

2,887,491

BIS(CARBONATOPROPOXY)DIOXANE

Arthur E. Gurgiolo, Lake Jackson, Tex., assignor to The Dow Chemical Company, Midland, Mich., a corporation of Delaware No Drawing. Application October 31, 1957
Serial No. 693,556

2 Claims. (Cl. 260—340.2)

This invention relates to a new compound, 2,3-bis(2,3-carbonatopropoxy)-1,4-dioxane, and methods for its production.

The compound of the invention has the following formula:

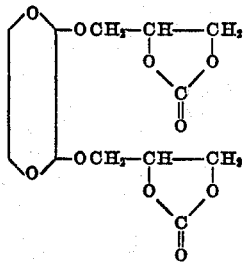

It is a white, crystalline compound melting at 148–49° C. and readily soluble in many organic solvents.

Because of the presence of the two reactive carbonato groups, the dicarbonate of the invention is particularly adapted for use in the preparation of resinous condensation products. Thus, it readily reacts with dicarboxylic acids to form alkyd-like resins and with aliphatic polyamines to form polyhydroxy polyurethane resins. The latter reaction and product are shown and claimed in the copending application of Arthur E. Gurgiolo et al., Serial No. 693,515, filed concurrently herewith.

2,3-bis-(2,3-carbonatopropoxy)-1,4-dioxane may be prepared in a variety of ways. Thus, it may be prepared by heating 2,3-bis(2,3-epoxypropoxy)-1,4-dioxane with $CO_2$ according to the general method described in the copending application of William A. Rogers, Jr. et al., Serial No. 614,051, filed October 5, 1956, now abandoned. The bis(epoxypropoxy)-dioxane may be made by condensing 2,3-dichloro-1,4-dioxane with glycidol or epichlorohydrin.

An alternative, and preferred, process for preparing the bis-(carbonatopropoxy) dioxane consists of condensing 2,3-dichloro-1,4-dioxane with two molar equivalents of 2,3-carbonatopropanol. The latter may be prepared from glycidol by the general method of Rogers et al. mentioned above. The synthesis is illustrated by the following example.

A mixture of 268 g. of 2,3-dichloro-1,4-dioxane, 403 g. of 2,3-carbonatopropanol (glycerol carbonate) and 250 ml. of carbon tetrachloride was refluxed at about 85° C. for 7 hr. The mixture was cooled and the crude product, which separated as a solid cake, was separated from the mother liquors by decanting the latter. It was washed with ethyl acetate and recrystallized from acetone to produce 246 g. of white crystals having a M.P. of 148–49° C.

When 79 g. of the above product was dissolved in 200 ml. of chlorobenzene, heated to 135° C. and mixed with 26 g. of diethylenetriamine, a syrupy polymeric product separated. Further heating of the polymer for 2 hr. at 135° C. converted it into a hard, brittle resin having a softening point of 45° C. This resin could be readily drawn into fibers at temperatures of 120° C. or higher and was readily soluble in water.

When the diethylenetriamine used in the above experiment was replaced with hexamethylenediamine, a water-insoluble but otherwise similar resin was produced. These resins are useful in wet-strength additives for paper, sizings for textiles, and the like.

I claim:
1. 2,3-bis(2,3-carbonatopropoxy)-1,4,dioxane.
2. A process for making 2,3-bis(2,3-carbonatopropoxy)-1,4-dioxane comprising heating at about 85° C. a mixture of 2,3-dichloro-1,4-dioxane and at least about two molecular equivalents of 2,3-carbonatopropanol.

References Cited in the file of this patent

UNITED STATES PATENTS 2,286,824     McNally et al. _____ June 16, 1942

OTHER REFERENCES

Wagner-Zook: Synthetic Organic Chemistry, Wiley, New York, 1953, p. 227.